(12) United States Patent
Kajiyama et al.

(10) Patent No.: US 6,430,143 B1
(45) Date of Patent: Aug. 6, 2002

(54) OPTICAL PICKUP DEVICE AND OPTICAL DISC RECORDING AND/OR REPRODUCING APPARATUS

(75) Inventors: Yoshihiro Kajiyama, Saitama; Junzo Kumakura, Kanagawa; Yasuo Osada, Saitama; Toshiyuki Kuroiwa; Hideo Nagasaka, both of Kanagawa; Kaneshiro Kondo, Chiba; Yutaka Shimada, Tokyo; Katsuo Matsumoto, Saitama; Hiroshi Ishizeki, Kanagawa; Shuichi Hirosawa; Yoshio Sugihara, both of Ibaraki, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/538,701

(22) Filed: Mar. 30, 2000

(30) Foreign Application Priority Data

Apr. 9, 1999 (JP) .......................................... 11-103233

(51) Int. Cl.⁷ ............................................... G11B 7/12
(52) U.S. Cl. ........................................ 369/244; 369/78
(58) Field of Search ............................ 369/112.01, 71, 369/244, 112.23, 44.14, 44.17, 77.1, 77.2, 219, 264, 270, 13.34, 75.1, 75.2, 249, 78

(56) References Cited

U.S. PATENT DOCUMENTS 5,995,467 A * 11/1999 Ohyama et al. ............... 369/71
6,185,180 B1 * 2/2001 Morishita .................... 369/215
6,219,327 B1 * 4/2001 Kim et al. .................... 369/244

FOREIGN PATENT DOCUMENTS

JP 06005062 * 1/1994

* cited by examiner

Primary Examiner—William Korzuch
Assistant Examiner—Kim-Kwok Chu
(74) Attorney, Agent, or Firm—Oblon, Spivak, McClelland, Maier & Neustadt, P.C.

(57) ABSTRACT

An optical pickup device for recording and/or reproducing the information on or from an optical disc. The optical pickup device includes a cover plate for covering said through-hole of said lid when said optical pickup unit is moved by said optical pickup feed unit until the objective lens is located outwardly of the optical disc loaded on said disc rotating driving unit;

an abutting portion provided on one of said lid and the cover plate, said abutting portion causing movement of said cover plate in a direction away from the objective lens when said optical pickup unit is moved by said optical pickup feed unit so that said objective lens is positioned outwardly of said optical disc; and an engagement portion provided on the other of said lid and the cover plate, said engagement portion engaging with said abutting portion when, after said cover plate is moved by said abutting portion in a direction away from the objective lens, the optical pickup unit is further moved to outwardly of the optical disc by said optical pickup unit. The optical pickup unit is held in stability on an outer rim side of the optical disc, whilst it is possible to prevent dust and dirt from being intruded inti its inside.

16 Claims, 6 Drawing Sheets

OPTICAL PICKUP DEVICE AND OPTICAL DISC RECORDING AND/OR REPRODUCING APPARATUS

BACKGROUND OF THE INVENTION

1. Field of the Invention

This invention relates to an optical pickup device for illuminating a light beam radiated from a light source on an optical disc loaded and rotationally driven on a disc rotating driving unit, for reading out the information signals recorded on the optical disc and/or recording information signals on the optical disc.

2. Background of the Invention

Up to now, an optical pickup device has been in use for converging a light beam radiated from a light source, such as a semiconductor laser, by an objective lens, and for illuminating the converged light beam, in order to read out the information signals recorded on the optical disc, or in order to record the information signals on the optical disc.

This sort of the optical pickup device is provided with optical components, such as a reflective mirror for guiding the light beam radiated from the light source to an objective lens or a photodetector for detecting the light beam reflected back from the optical disc.

Meanwhile, if, in an optical disc, dust and dirt have become affixed to the optical components, such as an objective lens or a reflective mirror, the volume of the light transmitted through the respective components is decreased to diminish the light volume to decrease the volume of the light incident on the photodetector to render it impossible to read out the information signals recorded on the optical disc accurately.

Thus, in a conventional optical pickup device, the objective lens arranged on an optical block and an objective lens driving unit adapted to move the objective lens along the optical axis of the objective lens and along a direction perpendicular to the optical axis of the objective lens, based on the focussing error signals and the tracking error signals, are covered by a lid, in order to prevent dust and dirt from becoming attached to the objective lens and in order to prevent duct and dirt from invading into the inside of the optical block, in which are housed the optical components, such as a reflective mirror or a photodetector.

The lid covering the objective lens and the objective lens driving unit is provided with a through-hole to permit the light beam transmitted through the objective lens so as to be illuminated on the optical disc and the light beam reflected back from the optical disc to fall on the objective lens. This through-hole is sized to be large enough to permit driving displacement of the objective lens therein. As a result, dust and dirt are intruded through this through-hole into the inside of the lid to contaminate the objective lens or other optical components in the optical block.

In order to prevent intrusion of dust and dirt through the through-hole provided in the lid covering e.g., the objective lens, an optical pickup device has been proposed in which a shutter for opening or closing the through-hole is provided in the lid. If, in such case, the shutter is not reliably opened or closed, there is a risk that the light beam from the light source be not illuminated on the optical disc. On the other hand, if a driving source provided on the disc recording and/or reproducing apparatus provided with the optical pickup device is utilized, the result is a complicated mechanism of the device.

In the Japanese Laying-Open Patent H-06-005062, there is disclosed a disc reproducing apparatus in which, if disc rotation is halted, the optical pickup is moved to a portion below the roof provided on the outer rim side of a disc housing recess to protect the optical pickup. Since the optical pickup proposed in the Japanese Laying-Open Patent H-06-005062 is moved to a portion below the roof in such a state in which the pickup is spaced apart from the roof, there is maintained a clearance which is large enough to prevent the roof from obstructing the movement of the optical pickup. Thus, only the movement means for causing the movement of the optical pickup serves as means for holding the optical pickup moved to the lower side of the roof, such that there is a possibility of the optical pickup being moved under an impact from outside.

SUMMARY OF THE INVENTION

It is therefore an object of the present invention to provide an optical pickup device and optical disc recording and/or reproducing apparatus which is free from the above-mentioned drawbacks.

The present invention provides an optical pickup device for recording and/or reproducing information signals for an optical disc by an optical pickup, the optical pickup device including an optical pickup unit, which optical pickup unit has an objective lens for converging a light beam radiated from a light source and for illuminating the converged light beam on the optical disc run in rotation by a disc rotating driving unit, an objective lens driving unit for driving and displacing the objective lens at least in a direction along the optical axis of the objective lens and a lid for covering the objective lens and the objective lens driving unit, having a through-hole for transmitting the light beam converged by the objective lens towards the optical disc. The optical pickup device also includes an optical pickup feed unit for feeding the optical pickup unit along the radial direction of the optical disc and for causing movement of the optical pickup unit until the objective lens is located on an outer rim side of the optical disc loaded on the disc rotating driving unit, a cover plate for covering the through-hole of the lid when the optical pickup unit is moved by the optical pickup feed unit until the objective lens is located outwardly of the optical disc loaded on the disc rotating driving unit, an abutting portion provided on one of the lid and the cover plate, and which is adapted for causing movement of the cover plate in a direction away from the objective lens when the optical pickup unit is moved by the optical pickup feed unit so that the objective lens is positioned outwardly of the optical disc. The optical pickup device also includes an engagement portion provided on the other of the lid and the cover plate, the engagement portion engaging with the abutting portion when, after the cover plate is moved by the abutting portion in a direction away from the objective lens, the optical pickup unit is further moved to outwardly of the optical disc by the optical pickup unit.

In the optical pickup device according to the present invention, the through-hole provided in the lid, which covers the objective lens and the objective lens driving unit can be covered by a cover plate during storage when the information signals are not recorded not reproduced on or from an optical disc, or during the time the optical pickup device is otherwise not used for prolonged time. Thus, it is possible to prevent dust and dirt from invading into the inside of the optical pickup unit to become affixed to optical components provided in the optical block to decrease the light volume of the light beam illuminated on the optical disc or reflected back from the optical disc to assure stable recording and/or reproduction of information signals.

In addition, with the optical pickup device according to the present invention, the cover plate and the lid are engaged with each other when the through-hole provided in the lid which covers the objective lens and the objective lens driving unit is covered by the cover plate, thus enabling the optical pickup to be held in stability against an external shock.

Moreover, with the optical pickup device according to the present invention, the opening in the cover plate and the abutting portion on the lid are engaged with each other when the through-hole provided in the lid which covers the objective lens and the objective lens driving unit is covered by the cover plate to provide a clearance narrower than the clearance between the roof of the Japanese Laying-Open Patent H-06-005062 and the optical pickup, thus more effectively preventing dust and dirt from invading into the inside of the optical pickup unit.

DESCRIPTION OF THE PREFERRED EMBODIMENTS

Figure 1:
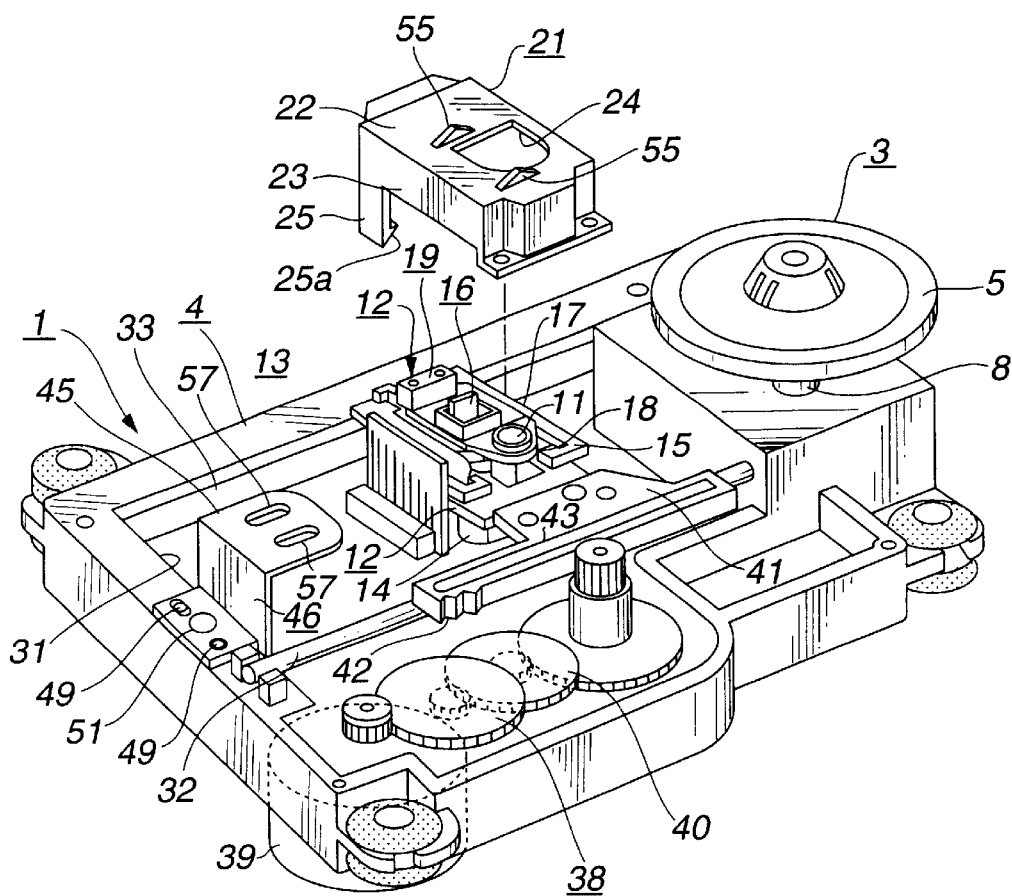
FIG. 1 is a perspective view showing an optical pickup device embodying the present invention and showing in particular the state in which the lid covering the objective lens is dismounted.

Referring to the drawings, preferred embodiments of according to the present invention will be explained in detail.

Figure 2:
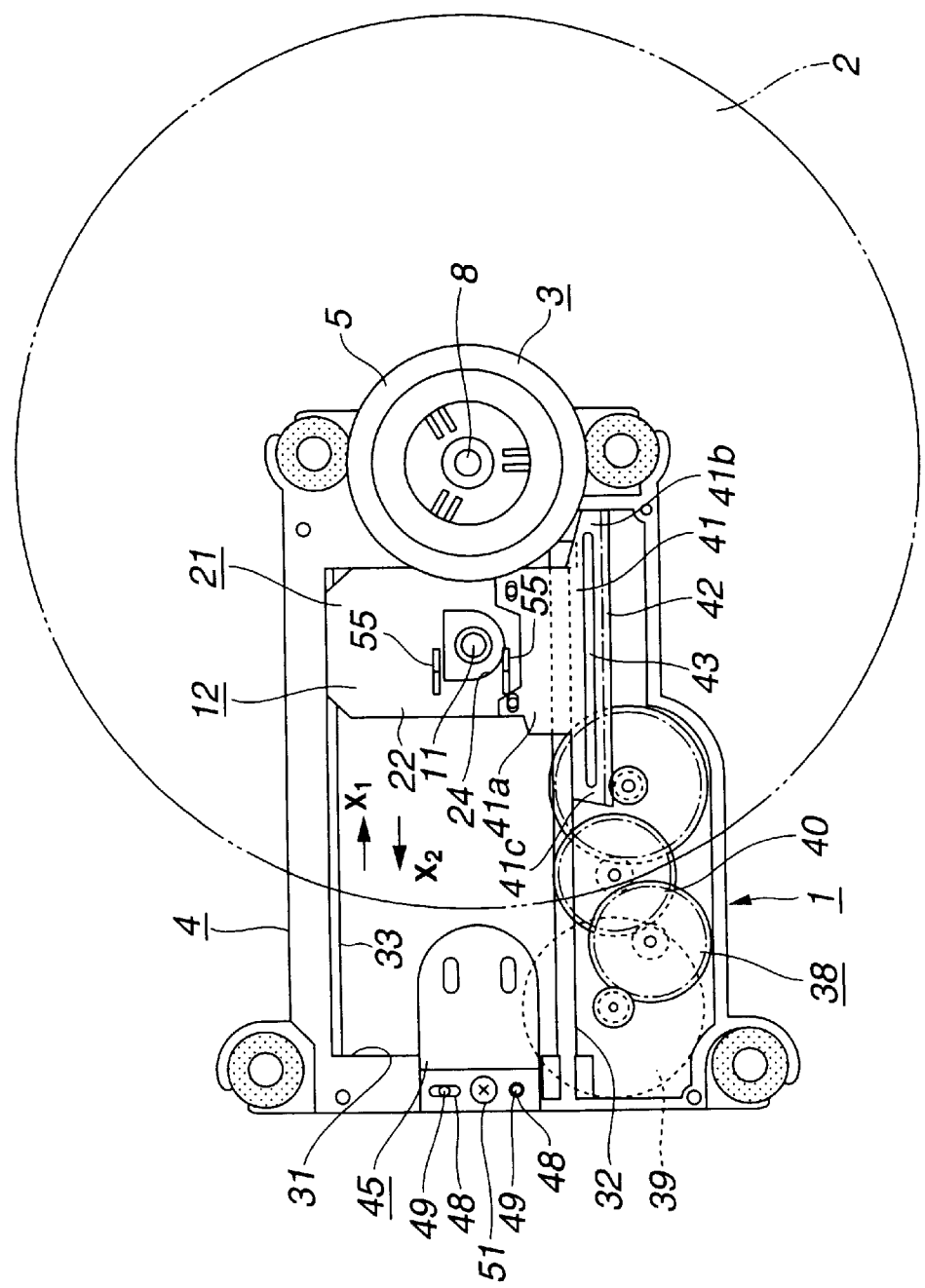
FIG. 2 is a plan view showing an optical pickup device embodying the present invention.

An optical pickup 1 according to the present invention is mounted on an optical disc drive device through a supporting frame 4 carrying a disc rotating driving unit 3 adapted for rotationally driving an optical disc 2, as shown in FIGS. 1 and 2.

Figure 3:
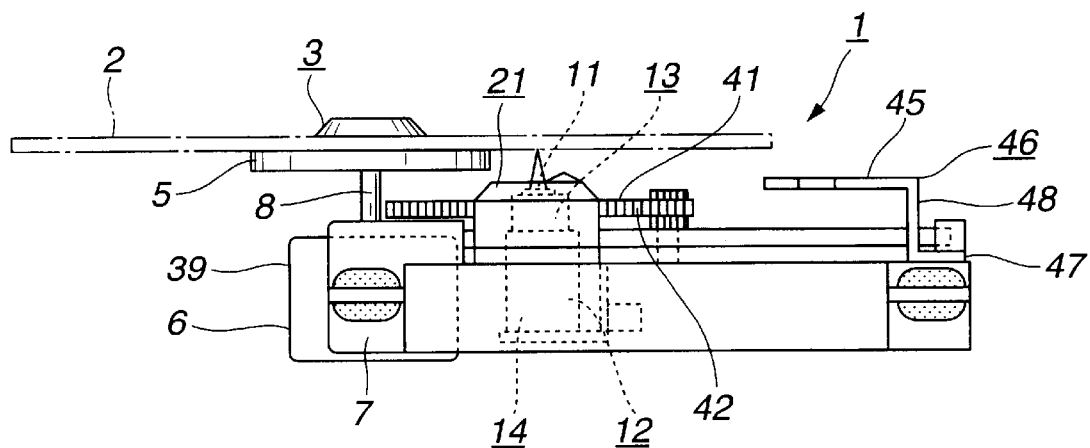
FIG. 3 is a side view showing an optical pickup device embodying the present invention.

The supporting frame 4, carrying the optical pickup device 1 according to the present invention, is molded from a synthetic resin to a substantially rectangular profile, and carries, on its one end, the disc rotating driving unit 3 adapted for rotationally driving the optical disc 2, as shown in FIG. 1. The disc rotating driving unit 3 also includes a disc table 5 for loading the optical disc 2 thereon and a spindle motor 6 for rotationally driving the disc table 5, as shown in FIG. 3. The disc rotating driving unit 3 is mounted on the supporting frame 4 by having the spindle motor 6 carried by a motor mounting portion 7 provided on one end of the supporting frame 4. The disc table 5 is mounted on the distal end of a spindle shaft 8 of the spindle motor 6 for rotation in unison with the spindle shaft 8. as shown in FIGS. 2 and 3.

The optical pickup device 1 includes an optical pickup 12 having an objective lens 11 which is adapted to converge the light beam radiated from a light source such as a semiconductor laser to the optical disc 2, run in rotation by the disc rotating driving unit 3, to illuminate the optical disc 2, as shown in FIGS. 1 and 3. The objective lens 11 is supported by an objective lens driving unit 13 adapted for displacing the objective lens 11 in a focussing direction parallel to the optical axis of the objective lens 11 and in a tracking direction which is a planar surface direction perpendicular to the optical axis of the objective lens and which is perpendicular to the above-mentioned focussing direction. The objective lens driving unit 13 is mounted on an optical block 14 carrying an optical system including a semiconductor laser as a light source.

The objective lens driving unit 13 includes a yoke 15, as a mounting portion for the optical block 14, a magnetic circuit portion 16, carrying a magnet mounted on the yoke 15, and an objective lens supporting unit 17 for carrying the objective lens 11 for displacement in the bi-axial directions of the focussing and tracking directions, as shown in FIGS. 1 and 2. This objective lens supporting unit 17 includes a lens bobbin 18 which holds the objective lens 11 at its one end. This lens bobbin 18 carries a focussing coil fed with focussing error signals adapted for displacing the objective lens 11 in the focussing direction and a tracking coil fed with tracking error signals adapted for displacing the objective lens 11 in the tracking direction. The lens bobbin 18 is carried by the distal end of left-side and right-side elastic supporting members secured to the proximal end of a stationary member 19 so that the lens bobbin 18 is supported for displacement in the focussing direction parallel to the optical axis of the objective lens 11, and in the tracking direction which is the planar surface direction perpendicular to the optical axis of the objective lens 11, about the stationary member 19 as center.

The optical block 14, mounting the objective lens driving unit 13, includes, enclosed in a tube barrel, an optical device comprised of a semiconductor laser, as a light source, a diffraction grating, a photodetector and prism integrated with one another. The diffraction grating splits the light beam radiated from the semiconductor laser into an order zero light beam as a main light beam and two order-one diffracted light beams as sub-beams. The photodetector detects the light beam reflected back from the optical disc. The prism reflects the light beam radiated from the semiconductor laser to guide the light beam reflected back from the optical disc to the photodetector.

Figure 4:
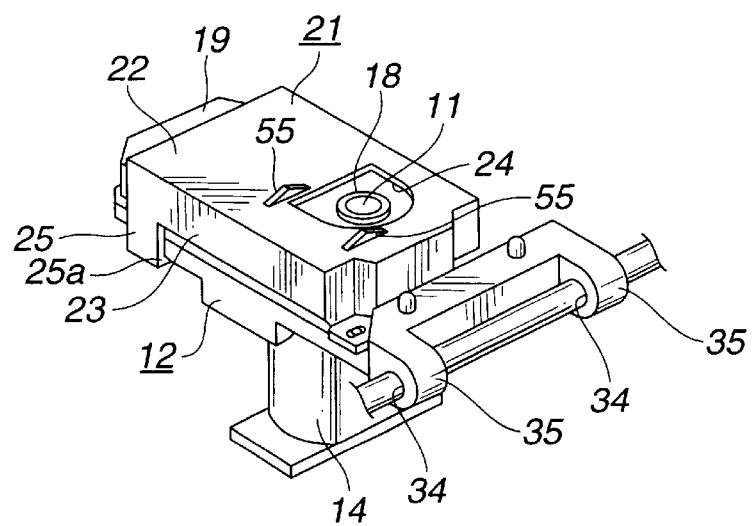
FIG. 4 is a perspective view showing an optical pickup constituting an optical pickup device embodying the present invention

The objective lens driving unit 13 mounted on the optical block 14 and the objective lens 11 supported by the objective lens driving unit 13 are covered by a lid 21, as shown in FIG. 4. The lid 21 includes a ceiling plate 22 overing the upper surface side of the objective lens 11 and the objective lens driving unit 13, and a peripheral wall section 23 provided around the ceiling plate 22, as shown in FIGS. 1 and 4, and is configured as a rectangular casing. The ceiling plate 22 is formed with a through-hole 24 for transmitting the light beam transmitted through the objective lens 11 for illumination on the optical disc 2 and for transmitting the return light beam reflected back from the optical disc 2. The through-hole 24 is sized to be large enough to prevent the objective lens 11 from coming into abutting contact with the ceiling plate 22 even in cases wherein the objective lens 11 is displaced significantly in the focussing direction as the objective lens 11 is displaced by the objective lens driving unit 13 in the tracking direction. That is, the through-hole 24 is sized to allow for displacement of the objective lens 11 therein.

The lid 21 is formed with a plurality of retainers 25 depending from the comers of the rectangular peripheral wall section 23. The distal ends of the retainers 25 are formed with retention pawls 25a. The lid 21 is mounted on the optical block 14 to cover the objective lens 11 and the objective lens driving unit 13, by the paired retainers 25 being engaged in paired engagement holes provided in the optical block 14 and by the remaining paired retainers being engaged in engagement recesses provided on both sides of the optical block 14.

The optical pickup 12, configured as described above, is carried by the supporting frame 4 for movement along the radius of the optical disc 2 mounted and rotationally driven on the disc rotating driving unit 3. This supporting frame 4 has an opening 31 in its mid portion for mounting the optical pickup 12 across the upper and lower sides of the supporting frame 4. On one side of the opening 31 is mounted a guide shaft 32 operating as a reference for the direction of movement of the optical pickup 12. On the opposite side of the opening 31 is formed a guide 33, extending parallel to the guide shaft 32, for guiding the direction of movement of the optical pickup 12. This guide 33 is constituted by a portion of the side edge of the opening 31.

The optical pickup 12 is provided on one end of the optical block 14 with a pair of guide shaft supporting pieces 35, 35, formed with guide shaft accommodating openings 34, 34, into which to insert the guide shaft 32, as shown in FIG. 4. On the opposite side of the optical block 14, there is provided a substantially L-shaped guide support piece, not shown, for supporting the guide 33. In the optical pickup 12, the objective lens 11 is caused to face the upper side of the supporting frame 4 so that the objective lens 11 will face the optical disc 12 loaded on the disc rotating driving unit 3, as shown in FIGS. 1 and 2. The optical pickup 12 is arranged in an opening 31 provided in the frame 4, by having the guide shaft 32 introduced into the guide shaft accommodating openings 34, 34 and by having the guide 33 supported in a clinching fashion by the opposite end of the optical pickup 12 and a guide support piece.

The optical pickup 12 is fed in a direction of arrows X1 and X2, parallel to the radius of the optical disc 2 loaded on the disc table 5 between the positions proximate to and spaced apart from the disc table 5 of the disc rotating driving unit 3 mounted on one end of the supporting frame 4.

The feeding operation of the optical pickup 12 is performed by an optical pickup feed unit 38 arranged on one side of the supporting frame 4 carrying the guide shaft 32. The optical pickup feed unit 38 includes a driving motor 39 mounted on the lower side of the supporting frame 4, a drive power transmitting gearing 40 for transmitting the driving power of the driving motor 39 to the optical pickup 12, and a rack plate 41 mounted on one end of the optical pickup 12 for meshing with the drive power transmitting gearing 40, as shown in FIG. 1. The rack plate 41 is molded from synthetic resin and has, on its one side, a gear 43 carrying a rack gear 42. The rack gear 42 meshes with a last stage gear of the drive power transmitting gearing 40.

Meanwhile, the gear 43 is elastically movable in a direction perpendicular to the longitudinal direction by having both longitudinal ends of the rack gear 42 carried by a pair of supports 41b, 41c protuberantly formed on a mounting portion 41a of the rack plate 41 on the optical pickup 12. Since the gear 43 can be moved elastically, the rack gear 42 is afforded with the elasticity and reliably engaged with the drive power transmitting gearing 40 to assure accurate feed of the optical pickup 12.

The optical pickup 12 is fed across the inner and outer rims of the optical disc 2, in the direction indicated by arrows X1 and X2 in FIG. 2, by the driving of the driving motor 39 and by the driving power of the driving motor 39 being transmitted through the drive power transmitting gearing 40 to the rack gear 42.

Figure 5:
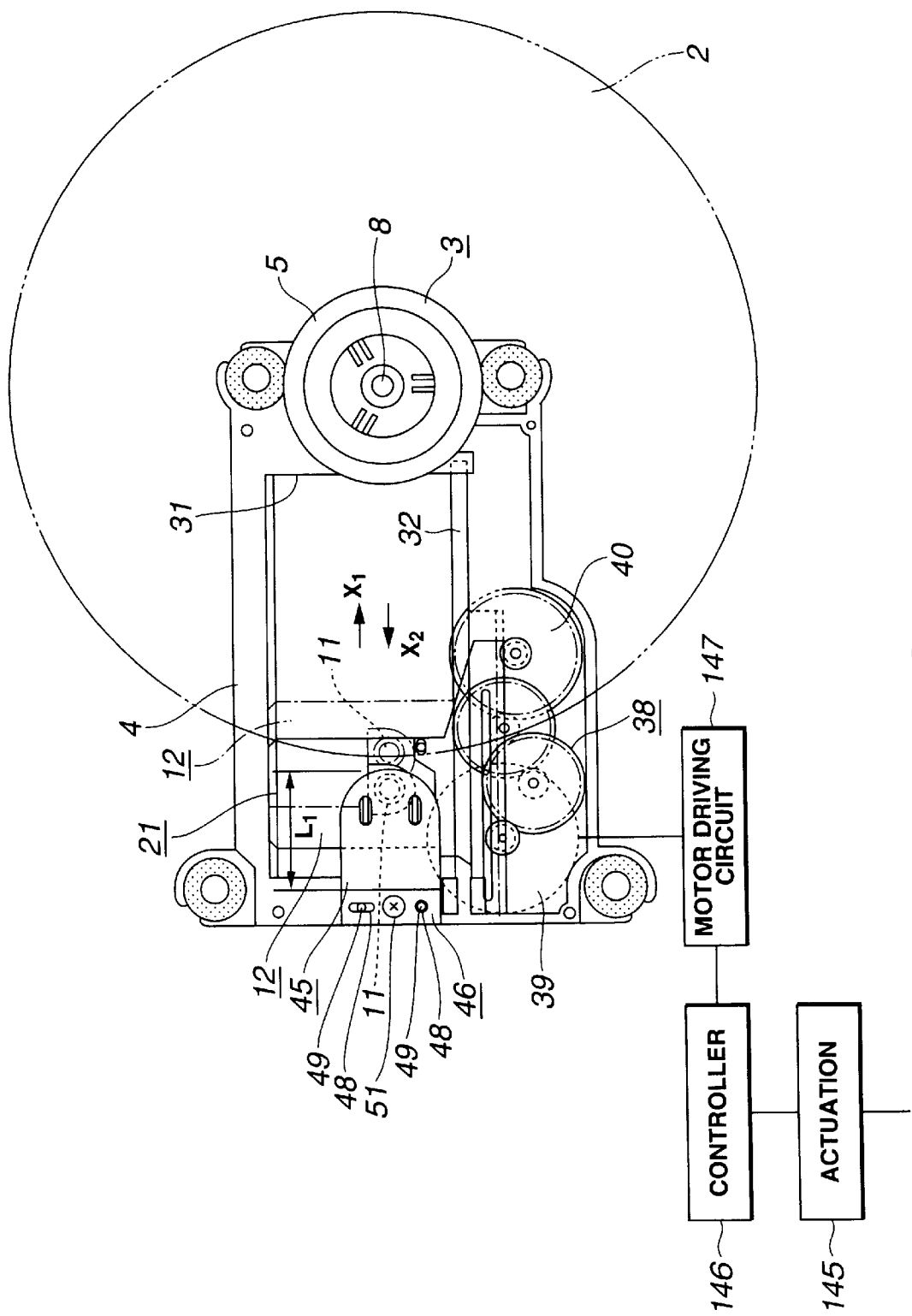
FIG. 5 is a plan view showing how the optical pickup embodying the present invention is being moved.

Meanwhile, the optical pickup 12 of the optical pickup 1 according to the present invention is carried by the guide shaft 32 and by the guide 33 for movement from a position in which the objective lens 11 faces the outer rim of the optical disc 2 loaded on the disc table 5 of the disc rotating driving unit 3 to an outer position outwardly of the optical disc 2 as indicated by a solid line in FIG. 5.

When a power switch provided on an actuating portion 145 of a recording and/or reproducing apparatus is acted on to halt the power supply to the portions of the disc recording and/or reproducing apparatus other than a driving controller 146 and a motor driving circuit 147, a command signal for causing the movement of the optical pickup 12 to the outer position of the optical disc 2 is issued from the driving controller 146 of the disc recording and/or reproducing apparatus to the motor driving circuit 147 which controls the driving of the driving motor 39 of the optical pickup feed unit 38. When the command signal is inputted to the motor driving circuit 147, the driving motor 39 drives the optical pickup 12 so that the optical pickup 12 is moved in the direction indicated by arrow X2 in FIG. 5. Thus, the optical pickup 12 is moved to and halted at a position in which the objective lens 11 is positioned at an outer position of the optical disc 2.

That is, if the power supply to the disc recording and/or reproducing apparatus employing this optical pickup device 1 is interrupted, with the disc recording and/or reproducing apparatus being then out of use, the optical pickup device 1 of the present invention keeps the optical pickup 12 in a state in which the objective lens 11 is positioned at an outer position of the optical disc 2.

Figure 6:
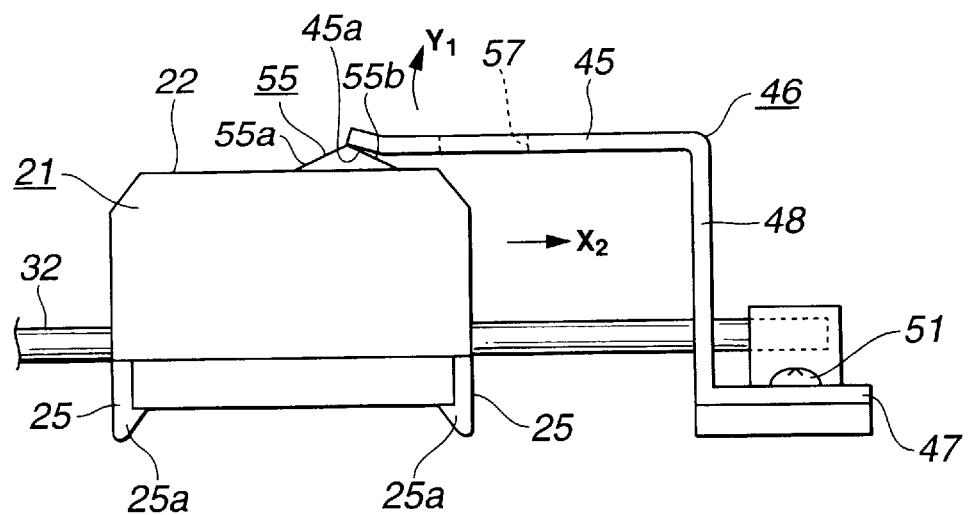
FIG. 6 is a side view showing how the optical pickup embodying the present invention is being intruded to the lower surface side of a lid.

The optical pickup device 1 of the present invention includes a cover plate 45 for closing the through-hole 24 provided in the lid 21 covering the objective lens 11 and the objective lens driving unit 13 when the optical pickup 12 has been moved to a position in which the objective lens 11 is at the outer position of the optical disc 2. The cover plate 45 is provided at the distal end of a cover member 46, as shown in FIGS. 1 and 6. The cover member 46 is prepared by molding a synthetic resin and has a mounting base 47 at its proximal end. From one side of the mounting base 47 is formed upright a substantially L-shaped supporting piece 48, from the distal end of which the cover plate 45 is protruded for extending in the horizontal direction. The cover plate 45 is of a thinner thickness than the supporting piece 48 and is elastically flexible in the direction indicated by arrows Y1 and Y2 in FIGS. 6 and 8 about the connecting point to the supporting piece 48 as a fulcrum point.

Figure 7:
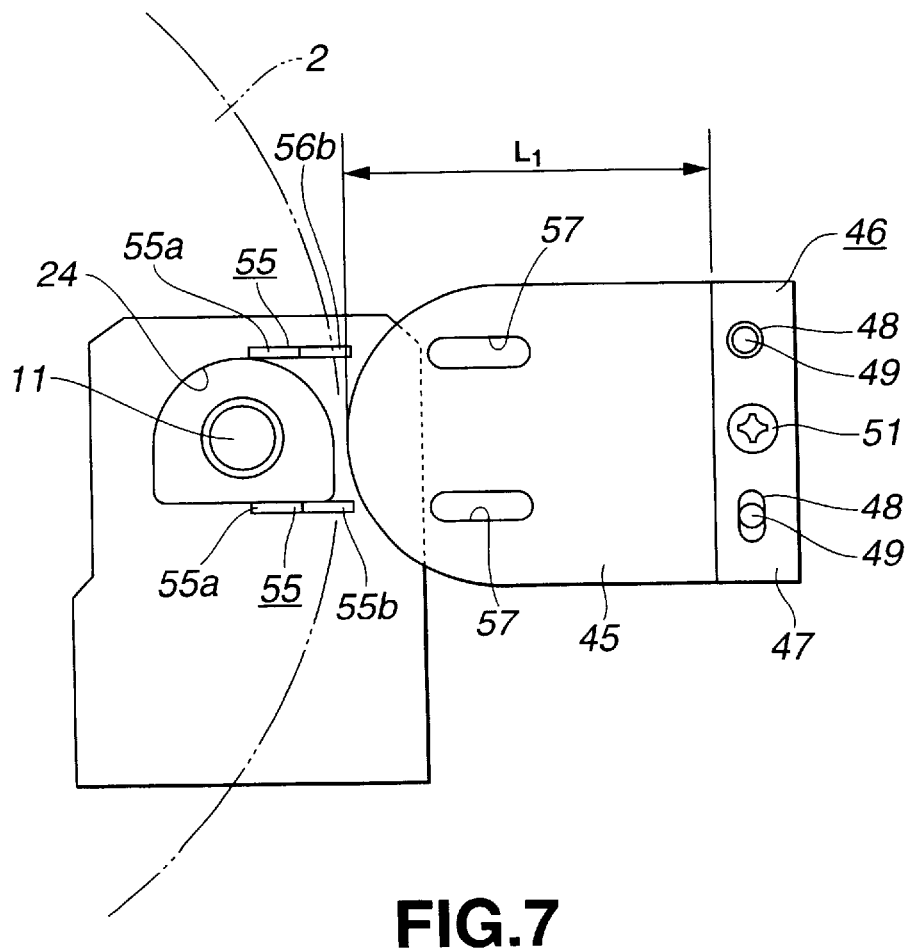
FIG. 7 is a plan view showing the relationship between the optical pickup and the cover plate according to the present invention.

The cover member 46 is provided on the side of the supporting frame 4 opposite to its side carrying the disc rotating driving unit 3, as shown in FIGS. 1 and 2, and the cover plate 45 is mounted for being projected towards the optical pickup 12. That is, the cover member 46 is mounted on the supporting frame 4, by paired positioning holes 48, 48 provided in the a mounting base 47 being engaged by positioning lugs 49, 49 set upright on the supporting frame 4, and by a set screw 51 inserted in a screw hole provided between the positioning holes 48, 48 being threaded in a tapped hole in the supporting frame 4, as shown in FIG. 7.

The cover plate 45 is of a length L1 such that, when the optical pickup 12 is moved until the objective lens 11 is positioned at an outer position of the optical disc 2, the cover plate 45 covers the through-hole 24 provided in the lid 21, with the cover plate 45 being then short of the outer rim of the optical disc 2 loaded on the disc rotating driving unit 3, as shown in FIG. 5. Also, the cover plate 45 is of such a height that, when the optical pickup is moved to a position lying outwardly of the optical disc 2, the cover plate 45 is in pressure contact with the ceiling plate 22 of the lid 21.

Meanwhile, the distal end of the cover plate 45 is slightly flexed towards the lid 21 in order to close the through-hole 24 positively. The distal end of the cover plate 45 is formed with an inclined guide 45a operative to evade collision of the optical pickup 12 against the lid 21 to allow for smooth intrusion of the optical pickup 12 on the lower surface side of the cover plate 45.

On the ceiling plate 22 of the lid 21, covered by the cover plate 45, there are provided a pair of ribs 55, 55 which, when the optical pickup 12 is intruded to the lower surface side of the cover plate 45, act as an operating portion for elastically displacing the cover plate 45 in a direction away from the ceiling plate 22, that is in the direction indicated by arrow Y1 in FIG. 6. These ribs 55, 55 are provided on both sides of the through-hole 24 for extending parallel to the direction of movement of the optical pickup 12, as shown in FIG. 7. The ribs 55, 55 are formed so as to be raised at a mid portion and are provided with inclined surfaces 55a, 55b gradually sloped towards the inlet and exiting side of the optical pickup 12. By provision of the inclined surfaces 55a, 55b, the cover plate 45 can be gradually elastically deformed when the optical pickup 12 is intruded towards or receded from the cover plate 45 to pen nit smooth movement of the optical pickup 12.

Figure 8:
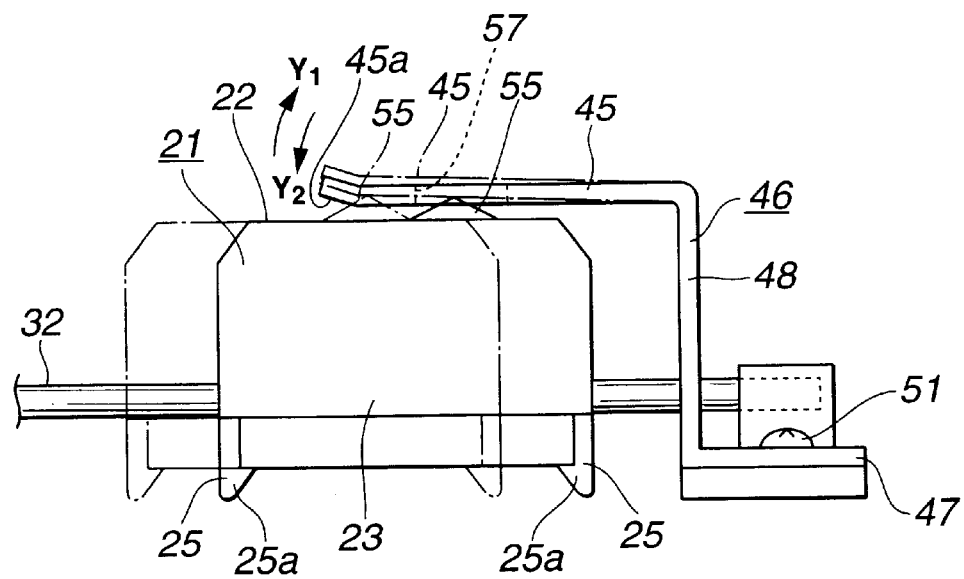
FIG. 8 is a side view showing how the optical pickup embodying the present invention is covered by the lid.
Figure 9:
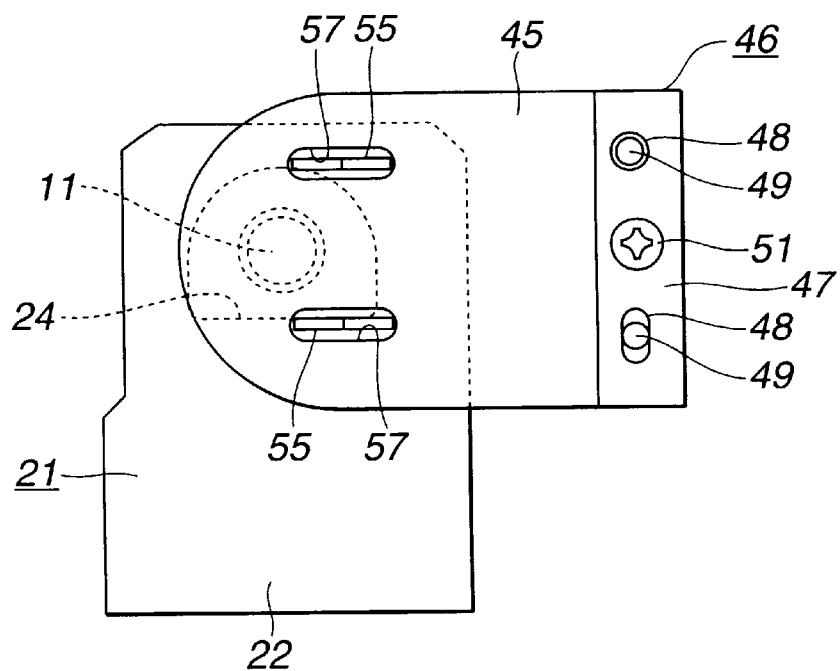
FIG. 9 is a plan view showing how a through-hole provided in the lid of the optical pickup is covered by the lid.

The cover plate 45 is provided with a pair of engagement openings 57, 57 engaged by a pair of ribs 55,55 provided on the ceiling plate 22 of the lid 21. These engagement openings 57, 57 are provided at such positions in which the engagement openings 57, 57 are engaged by the ribs 55, 55 when the optical pickup 12 has been moved to a position lying outwardly of the optical disc 2. Thus, when the optical pickup 12 is intruded to an underside portion of the cover plate 45, as shown in FIGS. 6 and 8, the cover plate 45 is elastically deformed by the ribs 55, 55 in the direction indicated by arrow Y1 in FIG. 6, that is in the direction away from the objective lens 11 and, when the optical pickup 12 has been moved to the position lying outwardly of the optical disc 2, as shown in FIG. 5, the ribs 55, 55 are engaged in the engagement openings 57, 57, whereby the ribs 55, 55 are elastically restored in the direction indicated by arrow Y2 in FIG. 8, that is towards the ceiling plate 22, to close the through-hole 24. At this time, the cover plate 45 is kept in the state of closing the through-hole 24, by the ribs 55, 55 engaging in the engagement openings 57, 57, as shown in FIG. 9.

In the optical pickup device 1 according to the present invention, as described above, when the power supply to the portions of the disc recording and/or reproducing apparatus other than a driving controller 146 and a motor driving circuit 147 is interrupted, a command signal for causing the movement of the optical pickup 12 to the position lying outwardly of the optical disc 2 is issued from the driving controller 146 of the disc recording and/or reproducing apparatus to the motor driving circuit 147 which controls the driving of the driving motor 39 of the optical pickup feed unit 38. This causes movement of the optical pickup 12 until the optical pickup 12 is positioned outwardly of the optical disc 2.

When the optical pickup 12 is moved to the position lying outwardly of the optical disc 2, the lid 21 which covers the objective lens and the objective lens driving unit 13 is intruded to below the lower surface of the cover plate 45. When the optical pickup 12 is moved further towards the cover plate 45 in the direction indicated by arrow X2 in FIG. 5, the ribs 55, 55 are intruded to a space below the lower surface of the cover plate 45, as shown in FIG. 8, so that the cover plate 45 is elastically displaced in the direction indicated by arrow Y1 in FIG. 8, that is in the direction away from the objective lens 11 of the optical pickup 12. When the optical pickup 12 has been moved to the halted position in which the optical pickup 12 lies outwardly of the optical disc 2, the ribs 55, 55 provided on the lid 21 are engaged in the engagement openings 57, 57 of the cover plate 45, with the cover plate 45 being elastically restored towards the ceiling plate 22 of the lid 21 in the direction indicated by arrow Y2 in FIG. 8 to close the through-hole 24 as shown in FIG. 9. After the optical pickup 12 is located in this manner in a space below the cover plate 45, the power supply to the controller 146 and to the motor driving circuit 147 is halted.

Thus, in the optical pickup device 1 according to the present invention, since the through-hole 24 provided in the lid 21 is covered by the cover plate 45 in the non-use state in which the power supply to the disc recording and/or reproducing apparatus employing the optical pickup device 1 is interrupted, it is possible to prevent dust and dirt from being intruded into the inside of the optical pickup 12 through the through-hole 2. It is noted that, since the driving power of the motor driving circuit 147 causes the movement of the optical pickup 12 against the restoring force proper to the cover plate 45 in a direction towards the lid, the driving power of the motor driving circuit 147 needs to be larger than the restoring force proper to the cover plate 45.

If, in the optical pickup device 1 according to the present invention, the power is supplied to the disc recording and/or reproducing apparatus employing the optical pickup device 1, the driving motor 39 of the optical pickup feed unit 38 is driven to cause the movement of the optical pickup 12 in the direction indicated by arrow X1 in FIG. 5, that is in the direction away from the cover plate 45. If the optical pickup 12 is moved in the direction away from the cover plate 45, the ribs 55, 55 are disengaged from the engagement openings 57, 57, so that the cover plate 45 is elastically displaced in the direction indicated by arrow Y1 in FIG. 8, that is in the direction away from the objective lens 11. The optical pickup 12 is moved in the direction away from the cover plate 45, as the cover plate 45 is elastically deformed. If the objective lens 11 has been moved to the position facing the outer rim of the optical disc 2, the cover plate 45 ceases to cover the through-hole 24, so that the light beam can be illuminated on the optical disc 2 through the through-hole 24.

If the disc respective apparatus, employing the optical pickup device 1 according to the present invention, is set to the state of recording information signals on the optical disc 2 or to the state of reproducing the information recorded on the optical disc 2, the cover plate 45 ceases to cover the optical pickup 12, thus enabling the recording and/or reproducing operation to be executed promptly.

In the above-described optical pickup device 1, the ribs 55, 55 elastically deforming the cover plate 45 are provided on the lid 21 of the optical pickup 12, and the engagement openings 57, 57 engaged by these ribs 55, 55 are provided on the cover plate 45. Alternatively, the ribs 55, 55 and the engagement openings 57, 57 may be provided on the inner side of thec45 and on the lid 21, respectively.

What is claimed is:

1. An optical pickup device for recording and/or reproducing information signals for an optical disc by an optical pickup, said optical pickup device comprising:

an optical pickup unit;

said optical pickup unit including an objective lens for converging a light beam radiated from a light source and for illuminating the converged light beam on the optical disc run in rotation by a disc rotating driving unit;

an objective lens driving unit for driving and displacing said objective lens at least in a direction along the optical axis of the objective lens; and a lid for covering said objective lens and the objective lens driving unit, said lid having a through-hole for transmitting the light beam converged by said objective lens towards the optical disc;

an optical pickup feed unit for feeding said optical pickup unit along the radial direction of said optical disc and for causing movement of said optical pickup unit until said objective lens is located on an outer rim side of the optical disc loaded on the disc rotating driving unit;

a cover plate for covering said through-hole of said lid when said optical pickup unit is moved by said optical pickup feed unit until the objective lens is located outwardly of the optical disc loaded on said disc rotating driving unit;

an abutting portion provided on one of said lid and the cover plate, said abutting portion causing movement of said cover plate in a direction away from the objective lens when said optical pickup unit is moved by said optical pickup feed unit so that said objective lens is positioned outwardly of said optical disc; and an engagement portion provided on the other of said lid and the cover plate, said engagement portion engaging with said abutting portion when, after said cover plate is moved by said abutting portion in a direction away from the objective lens, the optical pickup unit is further moved to outwardly of the optical disc by said optical pickup unit.

2. The optical pickup device according to claim 1 wherein said abutting portion is provided on said lid; and wherein said engagement portion is provided on said cover plate.

3. The optical pickup device according to claim 1 further comprising:

driving means for driving said optical pickup unit; and control means for receiving a stop command for the optical pickup device by a user and for controlling said driving means;

said control means performing control so that, on reception of said stop command, said driving means is driven until said optical pickup feed unit causes movement of said optical pickup unit to said outward position and so that power supply to said driving means then is halted.

4. The optical pickup device according to claim 3 wherein said cover plate is an elastic member; and wherein said driving means drives said optical pickup unit so that said optical pickup unit will be moved to the underside of said cover plate against the force of restoration of said cover plate towards said lid.

5. The optical pickup device according to claim 1 wherein said cover plate is located outwardly of said optical disc loaded on said disc rotating driving unit.

6. The optical pickup device according to claim 1 wherein one of said lid and said cover plate is provided with an inclined portion compressing against an abutting portion provided on the other of said lid and said cover plate to guide intrusion of said optical pickup unit to an underside of said cover plate of said optical pickup unit.

7. The optical pickup device according to claim 1 wherein said cover plate is an elastic member.

8. The optical pickup device according to claim 1 wherein said engagement portion is an opening provided in the other of said lid and said cover plate for engagement by said abutting portion.

9. An optical disc recording and/or reproducing apparatus for recording and/or reproducing the information for an optical disc by an optical pickup, said apparatus comprising:

a disc rotating driving unit for rotationally driving the optical disc loaded thereon;

an optical pickup unit including an objective lens for converging a light beam radiated from a light source on said optical disc loaded on said disc rotating driving unit;

an objective lens driving unit for driving and displacing said objective lens at least in a direction along the optical axis of the objective lens; and a lid for covering said objective lens and the objective lens driving unit, said lid having a through-hole for transmitting the light beam converged by said objective lens towards the optical disc;

an optical pickup feed unit for feeding said optical pickup unit along the radial direction of said optical disc and for causing movement of said optical pickup unit until said objective lens is located on an outer rim side of the optical disc loaded on the disc rotating driving unit;

a cover plate for covering said through-hole of said lid when said optical pickup unit is moved by said optical pickup feed unit until the objective lens is located outwardly of the optical disc loaded on said disc rotating driving unit;

an abutting portion provided on one of said lid and the cover plate, said abutting portion causing movement of said cover plate in a direction away from the objective lens when said optical pickup unit is moved by said optical pickup feed unit so that said objective lens is positioned outwardly of said optical disc; and an engagement portion provided on the other of said lid and the cover plate, said engagement portion engaging with said abutting portion when, after said cover plate is moved by said abutting portion in a direction away from the objective lens, the optical pickup unit is further moved to outwardly of the optical disc by said optical pickup unit.

10. The optical pickup device according to claim 9 wherein said abutting portion is provided on said lid; and wherein said engagement portion is provided on said cover plate.

11. The optical pickup device according to claim 9 further comprising:

driving means for driving said optical pickup unit; and control means for receiving a stop command for the optical pickup device by a user and for controlling said driving means;

said control means performing control so that, on reception of said stop command, said driving means is driven until said optical pickup feed unit causes movement of said optical pickup unit to said outward position and so that power supply to said driving means then is halted.

12. The optical pickup device according to claim 11 wherein said cover plate is an elastic member; and wherein said driving means drives said optical pickup unit so that said optical pickup unit will be moved to the underside of said cover plate against the force of restoration of said cover plate towards said lid.

13. The optical pickup device according to claim 9 wherein
said cover plate is located outwardly of said optical disc loaded on said disc rotating driving unit.

14. The optical pickup device according to claim 9 wherein
one of said lid and said cover plate is provided with an inclined portion compressing against an abutting portion provided on the other of said lid and said cover plate to guide intrusion of said optical pickup unit to an underside of said cover plate of said optical pickup unit.

15. The optical pickup device according to claim 9 wherein
said cover plate is an elastic member.

16. The optical pickup device according to claim 9 wherein
said engagement portion is an opening provided in the other of said lid and said cover plate for engagement by said abutting portion.

* * * * *

UNITED STATES PATENT AND TRADEMARK OFFICE
CERTIFICATE OF CORRECTION

PATENT NO. : 6,430,143 B1 Page 1 of 1
DATED : August 6, 2002
INVENTOR(S) : Yoshihiro Kajiyama et al.

It is certified that error appears in the above-identified patent and that said Letters Patent is hereby corrected as shown below:

<u>Title page,</u>
Item [57], ABSTRACT,
Line 23, change "inti" to -- into --.

<u>Column 1,</u>
Line 42, change "duct" to -- dust --.

<u>Column 2,</u>
Line 47, insert -- side -- between "other" and "of".
Line 55, insert -- , -- between "unit" and "can".
Line 57, change "not" to -- nor --.

<u>Column 3,</u>
Line 45, insert -- diagrams -- before "according".
Line 66, change "." (first occurrence) to -- , --.

<u>Column 6,</u>
Line 61, delete "a".

<u>Column 7,</u>
Line 30, change "pen nit" to -- permit --.

<u>Column 8,</u>
Line 63, change "thec45" to -- the cover plate 45 --.

Signed and Sealed this

Eighteenth Day of February, 2003

JAMES E. ROGAN
*Director of the United States Patent and Trademark Office*